Patented Nov. 26, 1929

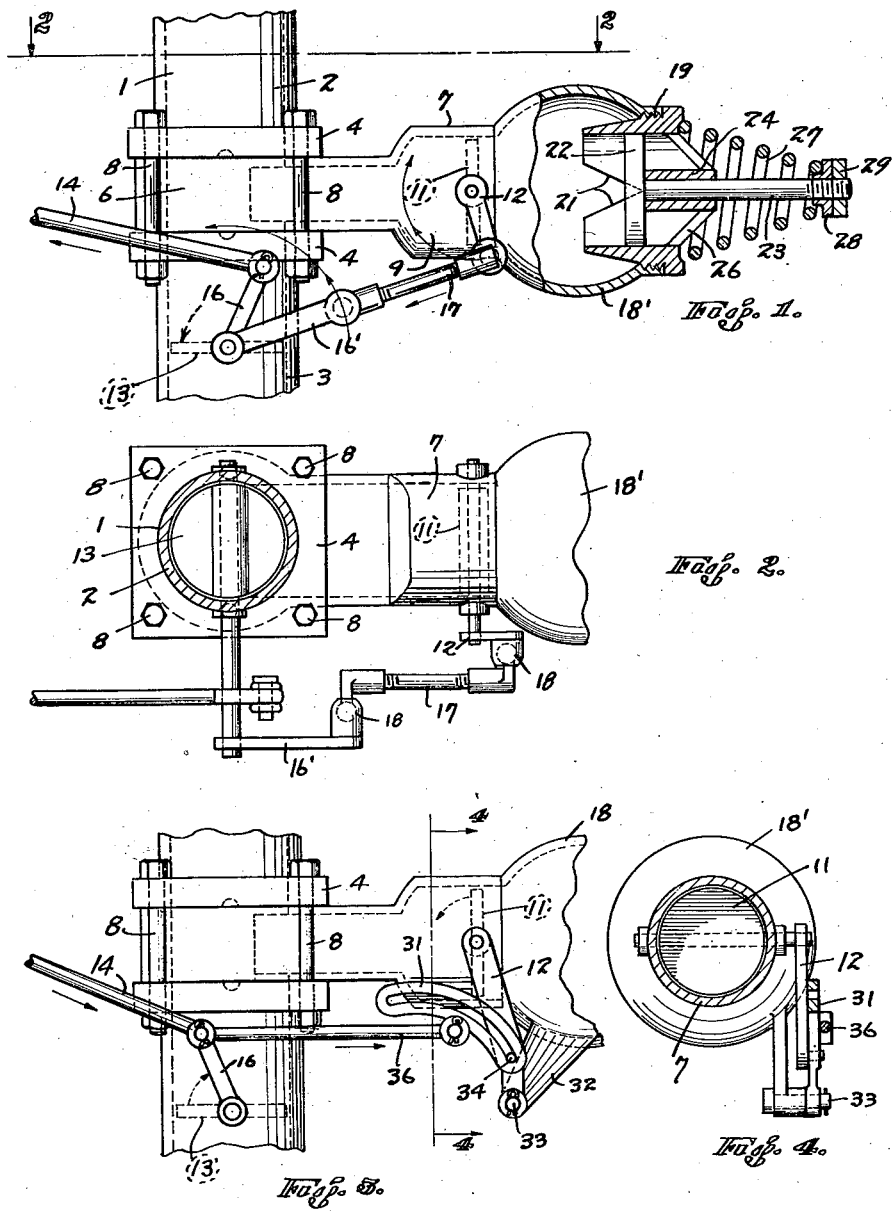
Nov. 26, 1929.  O. MORTENSON ET AL  1,737,196
FUEL CONTROL
Filed June 7, 1927
INVENTOR
OLAF MORTENSON.
OLFAN DE GUIRE —
BY
ATTORNEYS.

1,737,196

UNITED STATES PATENT OFFICE

OLAF MORTENSON AND OLFAN DE GUIRE, OF SILVERTON, OREGON

FUEL CONTROL

Application filed June 7, 1927. Serial No. 197,098.

The present invention relates to improvements in fuel control, and has particular reference to the fuel control of an internal combustion engine of a motor vehicle, and its object is to provide control means for the forming of the charge in accordance with the requirements of the engine under various conditions. It is proposed in the present invention to provide for this purpose an auxiliary air supply to be drawn on by the suction of the engine as the speed of the vehicle increases. Our control means is arranged in such a manner that under normal traveling conditions on level road the auxiliary air supply increases as the speed of the vehicle increases, the rate of increase being preferably somewhat out of proportion to the rate at which the speed increases, so that at low speed the auxiliary air supply will be practically zero and will increase slowly as the speed of the vehicle begins to increase, and faster when the speed becomes considerable.

In addition to the application of this general principle of increasing the auxiliary air supply as the speed of the vehicle increases, our invention is controlled by other considerations having reference to the load to be moved by the engine. Changes in load of this character in connection with vehicles are principally due to unevenness in grade, and we find that while the principle outlined above serves well for travel on level road, different conditions prevail whenever the vehicle takes a grade.

In this connection it might be stated by way of introduction that as a rule the mixture in an internal combustion engine should be such that the explosive power is entirely consumed during the power stroke, and on the other hand that it should not be consumed until approximately at the end of the power stroke. A rich mixture burns more quickly than a lean mixture, within a certain range. When the load increases and substantially the same speed is to be maintained, the driver will open the throttle and thereby increase the compression. Increased compression calls for a richer mixture which will explode more quickly. At the same time, when the load increases, as in taking a grade, the suction decreases, and it is the principal object of the present invention to utilize this decrease in suction for controlling the auxiliary air supply in such a manner as to produce a richer mixture, it being understood, of course, that adjustments should be made to prevent increase of the mixture beyond a predetermined degree best suited for heavy loads.

The combination of the two considerations outlined above for producing best results for normal traveling conditions as well as for heavy load conditions forms one of the objects of this invention, and while this combination may be realized in many different ways we have shown only the preferred form of carrying out our ideas in the accompanying drawing, in which Figure 1 shows an auxiliary air supply and control elements for the same in connection with the intake pipe of an internal combustion engine, parts being shown in side elevation and parts in section;

Figure 2 a plan view of a part of the device shown in Figure 1 as seen from line 2—2 of the latter figure;

Figure 3 a fragmentary view showing a modified valve operating mechanism; and

Figure 4 a section taken along line 4—4 of Figure 3.

While we have shown only the preferred form of our invention, it should be understood that various changes or modifications may be made within the scope of the claims hereto attached without departing from the spirit of the invention.

Referring to the drawings in detail, it will be seen that the intake pipe 1 of an internal combustion engine presents two spaced sections 2 and 3 formed with confronting flanges 4 adapted to receive between the same a short pipe section 6 forming a part of a housing 7 extending laterally therefrom. The short pipe section 6 is clamped in place by means of bolts 8 extending through the flanges 4. The housing 7 may be formed in any suitable manner and preferably presents at a short distance from the intake pipe a cylindrical section 9 in which is mounted a butterfly valve 11. This valve is operated by means of an arm 12 and is controlled in common with the throttle valve 13 provided in the intake pipe below the pipe section 6. The common control comprises a rod 14 adapted for manual control by the driver and pivotally engaging an arm 16 associated with the throttle valve and a toggle joint between the throttle valve 13 and the arm 12, including an arm 16' and a link 17 fastened to the ends of the arms 12 and 16 by means of ball and socket joints 18. As indicated by the arrows, rearward movement of the rod 14 causes both valves 11 and 13 to open, but the toggle joint causes the valve 11 to open at a different ratio from that of valve 13, the opening of the valve 11 being slow in the beginning, and comparatively faster at a later stage.

Adjacent the cylindrical section 9 of the housing 7 there is provided a bulb-shaped section 18', into the outer end of which is threaded a cylinder 19 having V-shaped cuts 21 in the inner end thereof, and having a piston 22 slidable therein. The piston 22 has a rod 23 extending therefrom, which latter rides in a guide 24 supported in the cylinder 19 by means of braces 26. A spring 27 surrounds the rod and bears with one end on the outer end of the cylinder 19, while the other end bears against a nut 28 threaded on the outer end of the rod 23. The tension of the spring may be adjusted by movement of the nut 28 which is held in place by means of a lock nut 29.

The operation of the device as illustrated in Figures 1 and 2 is as follows:

When the engine is idling practically no air enters through the auxiliary valve. When the vehicle travels at comparatively slow speed the throttle 13 is opened only slightly and the opening of the valve 11 will also be very slight, so that only little auxiliary air enters into the intake pipe. As the speed is increased the throttle valve 13 is opened further with a corresponding or proportionately larger increase in the opening of the valve 11, allowing the suction of the engine to draw in the piston 22 against the action of the spring 27, so as to allow an increasing supply of air to enter through the V-shaped cuts 21, the air supply increasing at a progressive rate due to the V-shape of the cuts.

When the vehicle ascends a grade and the driver in the attempt of maintaining his speed opens the throttle, the compression increases and it is desirable according to the theories advanced heretofore that the mixture should increase in richness. The opening of the valve 11 taken by itself would produce the opposite effect, since it would allow more air to enter and would make the mixture leaner instead of richer. Provision is made for this contingency, however, by the provision of the spring operated piston which responds to the suction in the intake pipe and since under heavy load this suction decreases, the piston 22 tends to recede under the influence of the spring 27 and to close the V-shaped cuts 21 against the atmosphere, so that no air enters, although the valve 11 may be opened due to the opening of the throttle 13. In this manner, therefore, the desired result is obtained and the mixture is rendered richer in spite of the opening of the valve 11.

The tension of the spring 27 is preferably adjusted with this point in view, that it should maintain the piston 22 in valve-closing position when the vehicle ascends a grade. For this purpose adjustment is made while a grade is ascended, and the nut 28 is screwed downward until the spring has a tension sufficient to prevent entry of atmospheric air while the vehicle is going uphill. This does not interfere with the normal functioning of the valve on the level road, since under this condition the suction is sufficiently strong to overcome the action of the spring 27.

In Figures 3 and 4 is shown a somewhat different mechanism for the common control of the two valves 11 and 13, the control including a slotted arc-shaped member 31 pivoted to a fixed bracket 32 as at 33, and arranged to allow a pin 34 rising from the arm 12 to ride therein. The member 31 is connected to the end of the arm 16 by means of a link 36.

We claim:

1. A fuel control for an internal combustion engine having a throttle valve comprising an auxiliary air intake, a valve for the same and a common control for the two valves including means for operating the first valve at a practically constant rate and the second valve at an accelerating speed ratio.

2. A fuel control for an internal combustion engine having a throttle valve comprising an auxiliary air intake, a valve for the same and a common control initiating opening movement of the two valves simultaneously and arranged to open the second valve slowly at the beginning and at a faster ratio thereafter.

3. A fuel control for an internal combustion engine having a throttle valve comprising an auxiliary air intake, a valve for the same, a common control for the two valves including means for operating the first valve at a practically constant rate and the second valve at an accelerating speed ratio and suction-responsive means controlling all the air passing through the auxiliary air intake, the latter means being constructed to admit air at an accelerating rate.

4. A fuel control for an internal combustion engine having a throttle valve, comprising an auxiliary air intake, a valve for the same and a common control initiating opening movement of the two valves simultaneously and arranged to open the second valve slowly at the beginning and at a faster ratio thereafter, and suction-responsive means controlling all the air passing through the auxiliary air intake, the latter means being constructed to admit air at an accelerating rate.

OLAF MORTENSON.
OLFAN DE GUIRE.